United States Patent
Mull, Jr. et al.

(10) Patent No.: US 9,803,540 B2
(45) Date of Patent: Oct. 31, 2017

(54) INTAKE SYSTEM FOR AN INTERNAL COMBUSTION ENGINE

(71) Applicant: Ford Global Technologies, LLC, Dearborn, MI (US)

(72) Inventors: Ted Vincent Mull, Jr., Belleville, MI (US); Brian David Knotts, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/017,780

(22) Filed: Feb. 8, 2016

(65) Prior Publication Data
US 2017/0226923 A1 Aug. 10, 2017

(51) Int. Cl.
*F02M 35/104* (2006.01)
*F02B 29/02* (2006.01)
*F02M 35/10* (2006.01)
*F02F 1/24* (2006.01)

(52) U.S. Cl.
CPC .............. *F02B 29/02* (2013.01); *F02F 1/24* (2013.01); *F02M 35/104* (2013.01); *F02M 35/10314* (2013.01); *F02M 35/10354* (2013.01)

(58) Field of Classification Search
CPC F02B 29/02; F02M 35/104; F02M 35/10354; F02M 35/10314; F02F 1/24
USPC .............................. 123/184.21–184.61, 48 B
See application file for complete search history.

(56) References Cited

U.S. PATENT DOCUMENTS

| | | | | |
|---|---|---|---|---|
| 6,026,774 A | * | 2/2000 | Kajihara | F02F 11/00 123/184.21 |
| 2007/0246009 A1 | * | 10/2007 | Suzuki | F02B 31/04 123/336 |
| 2008/0022960 A1 | * | 1/2008 | Tsuchiya | F02B 31/06 123/184.21 |
| 2008/0271697 A1 | | 11/2008 | Vichinsky | |
| 2008/0314352 A1 | | 12/2008 | Brosseau et al. | |
| 2010/0031926 A1 | | 2/2010 | Magnuson | |
| 2011/0162611 A1 | * | 7/2011 | Zhang | F02M 35/10085 123/184.56 |
| 2012/0291755 A1 | * | 11/2012 | Perez | F02B 75/048 123/48 B |
| 2013/0118433 A1 | * | 5/2013 | Tochizawa | F02M 35/10026 123/184.21 |
| 2013/0319381 A1 | | 12/2013 | Arvizu Dal Piaz | |

OTHER PUBLICATIONS

USCAR Benchmarking, U78 2013 Audi A8, Design Analysis, Cylinder Head—Intake, 1 page.
LEP Benchmarking, U27 2005, Audi A6, Design Analysis, Cylinder Head—Intake Flap, 1 page.

* cited by examiner

*Primary Examiner* — Marguerite McMahon
(74) *Attorney, Agent, or Firm* — Brooks Kushman P.C.; Greg Brown

(57) ABSTRACT

An engine includes a cylinder head having a first face defining an entrance to an intake port, and an intake manifold having a second face defining an outlet from a runner. The first and second faces mate to fluidly connect the entrance and the outlet, and an area mismatch or offset exists between the entrance and the outlet. A tongue is positioned into the intake port to extend over a floor of the intake port and has an area substantially equal to a difference between the entrance area and the outlet area. The tongue maintains in-charge motion and mixing of intake gases in-cylinder in the engine.

19 Claims, 4 Drawing Sheets

INTAKE SYSTEM FOR AN INTERNAL COMBUSTION ENGINE

TECHNICAL FIELD

Various embodiments relate to an air intake system for an internal combustion engine.

BACKGROUND

Internal combustion engines include components such as cylinder blocks and cylinder heads that are often formed using casting, die casting, or other process. These components and their manufacturing techniques often involve extensive development and tooling times and costs.

In certain scenarios, it may be desirable to continue to the use these components while changing the underlying engine configuration, for example, by downsizing the engine to a lower displacement. The downsized engine may use the same carryover block and head with either the same intake manifold or a new intake manifold specifically designed for the smaller engine, and this may result in a loss of engine performance due to a change in combustion characteristics in cylinder.

SUMMARY

In an example, an engine is provided with a cylinder head having a first face defining an entrance to an intake port, and an intake manifold having a second face defining an outlet from a runner. The first and second faces mate to fluidly connect the entrance and the outlet. A tongue is positioned to extend over a floor of the intake port and has an area substantially equal to a difference between the entrance area and the outlet area.

In another example, a method is provided. A cylinder head is provided and has a first face defining an entrance to an intake port. An intake manifold is formed and has a second face defining an outlet from a runner. A tongue is inserted along a floor of the intake port while connecting the first and second faces to fluidly connect the outlet with the entrance. The tongue is sized to fill an offset between the outlet and the entrance.

In another example, an intake manifold assembly is provided with at least one shell forming an intake runner with a mounting face defining an outlet from the runner, where the mounting face is adapted to connect to a corresponding mounting face of a cylinder head. A tongue extends outwardly from the mounting face of the shell and has a surface aligned with a floor of the intake runner. The tongue is configured to be inserted into an intake port of the cylinder head.

Various embodiments according to the present disclosure have associated, non-limiting advantages. For example, an insert or tongue is provided that extends into the intake port of the cylinder head of an engine. The tongue is sized and shaped to extend along the floor of the port to fill an area mismatch between the intake port of the cylinder head and a corresponding runner of an intake manifold. The area mismatch occurs, for example, when an engine is downsized and a new intake manifold is provided for use with the cylinder head. The tongue may be integrally formed with the intake manifold, or may be provided as an additional insert that is positioned between the head and manifold during assembly. The tongue acts as a control mechanism for intake air flow into the engine and cylinder by avoiding a sudden expansion at the cylinder head face which maintains the air intake velocity further into the cylinder head port and increases tumble into the cylinder.

DETAILED DESCRIPTION

As required, detailed embodiments of the present disclosure are provided herein; however, it is to be understood that the disclosed examples are merely exemplary of the disclosure and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
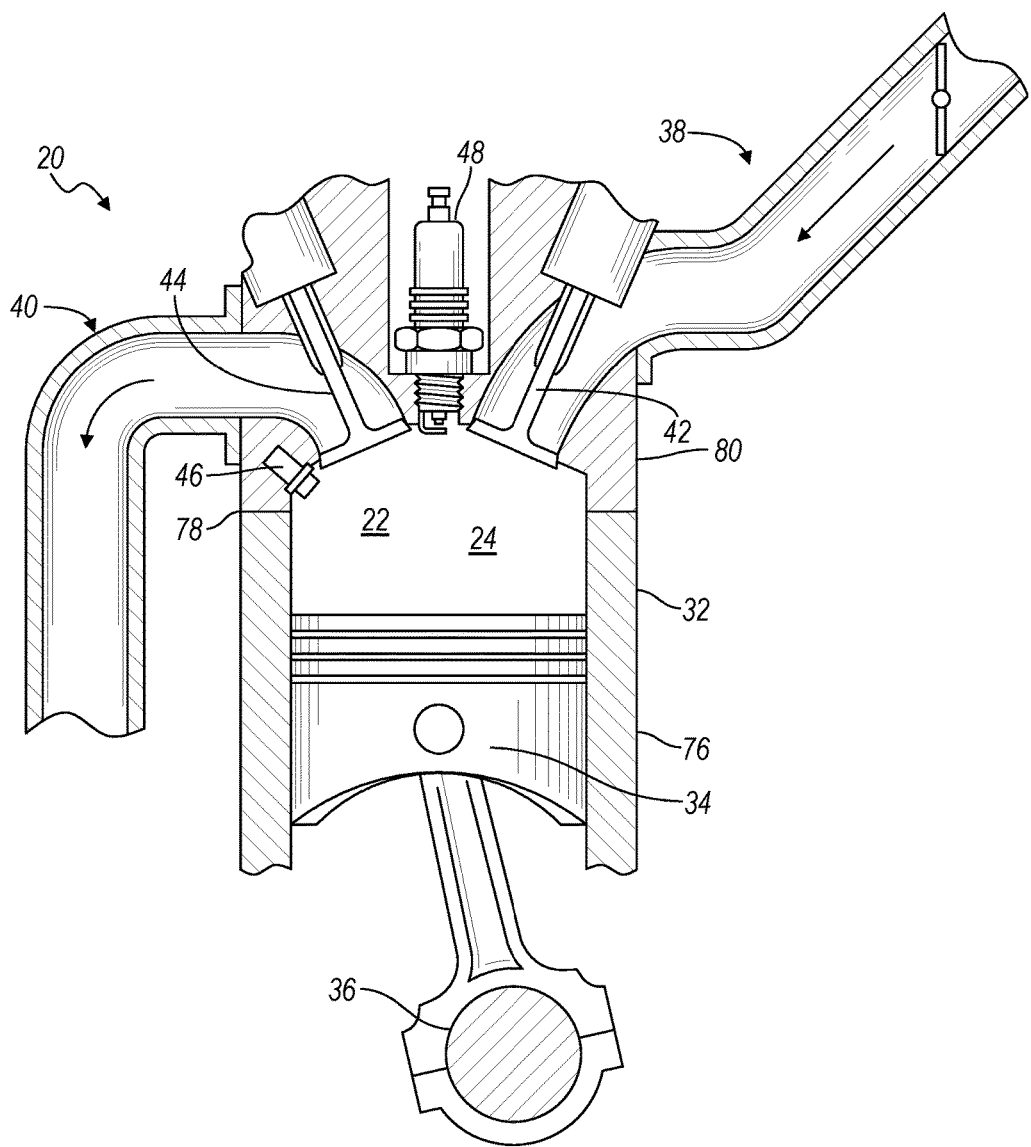
FIG. 1 illustrates a schematic view of an internal combustion engine configured to implement various embodiments of the present disclosure.

FIG. 1 illustrates a schematic of an internal combustion engine 20. The engine 20 has a plurality of cylinders 22, and one cylinder is illustrated. The engine 20 may have any number of cylinders 22, including three, four, six, eight, or another number. The cylinders may be positioned in various configurations in the engine, for example, as a V-engine, an inline engine, or another arrangement.

The engine 20 has a combustion chamber 24 associated with each cylinder 22. The cylinder 22 is formed by cylinder walls 32 and piston 34. The piston 34 is connected to a crankshaft 36. The engine 20 displacement may be controlled in part by the distance that the piston 34 travels in the cylinder 22, also known as the stroke. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the"

ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. The engine 20 may use direct injection or a port fuel injection system. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an after treatment system such as a catalytic converter.

The intake and exhaust valve 42, 44 positions and timing, as well as the fuel injection timing and ignition timing may be varied for the various engine strokes.

The engine 20 includes a cooling system to remove heat from the engine 20, and may be integrated into the engine 20 as a cooling jacket containing water or another coolant.

A head gasket 78 is positioned between the cylinder block 76 and the cylinder head 80 to seal the cylinders 22.

Figure 2:
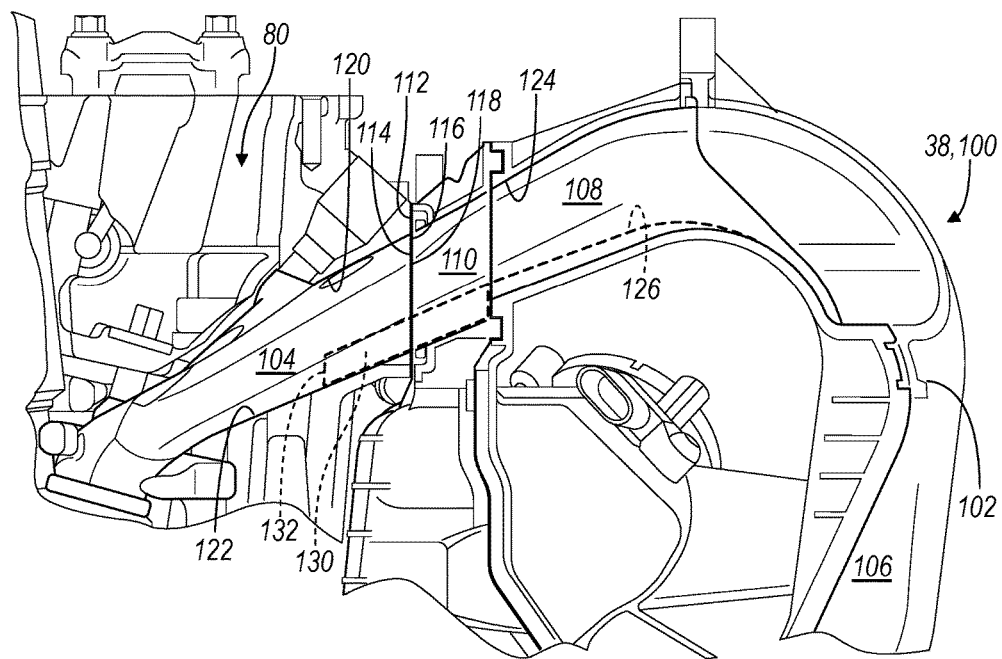
FIG. 2 illustrates a side schematic view of a cylinder head and an intake manifold according to an embodiment.
Figure 3:
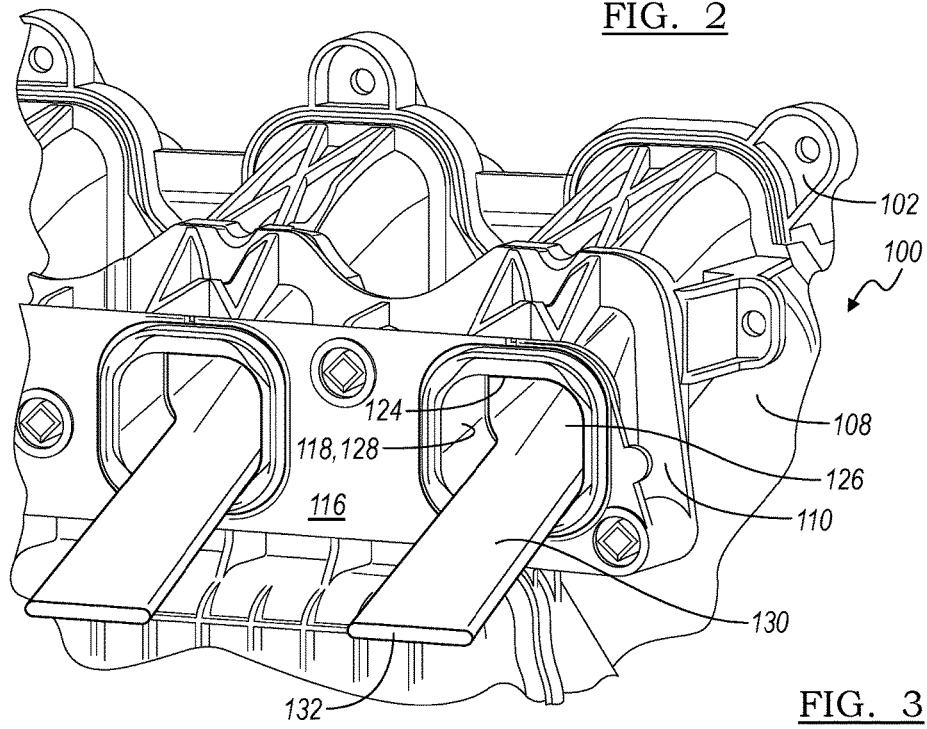
FIG. 3 illustrates a perspective view of the intake manifold of FIG. 2.

FIGS. 2-3 illustrates an intake 38 and cylinder head 80. The cylinder head 80 is used with engine 20, and may originally be designed for a first specified displacement and used with an engine having a second displacement in the present example, where the second displacement is less than the first. In one example, the head 80 is formed from a metal material, although other materials are also contemplated. The engine 20 may be downsized for the reduced second displacement, for example, by shortening the stroke of the piston in the cylinder. When the engine is downsized, the original cylinder block and head 80 may be continued to be used as a carryover block and head, and the intake 38 may be redesigned for use with the present smaller displacement engine to have smaller effective diameter intake air paths that are sized based on the smaller displacement engine. This downsizing of the engine and redesign of the intake 38 may result in reduced mixing in-cylinder. The present examples of the disclosure provide for increased velocity of intake gases in the intake port, and a corresponding increase in velocity, mixing, and charge motion in-cylinder. In one example, the cylinder head 80 was originally designed for use with a 1.5 liter engine, and is used as a carryover head in a downsized engine having a 1.2 liter displacement with a new intake 38 as shown in FIG. 2. In other examples, the engine may have a different original displacement and a different downsized displacement.

The intake 38 includes an intake manifold 100 that includes a plenum and a series of runners 102. Each runner 102 is fluidly connected to an intake port 104 of the cylinder head 80. The runners 102 provide the intake gases, including ambient air, exhaust gases from exhaust gas recirculation, etc. to the intake valves 42. The intake manifold 100 may also include a throttle valve to control the flow of intake gases to the plenum, and the valve position may be electronically or mechanically controlled. The intake 38 may be connected to an exhaust gas recirculation (EGR) system, a canister purge valve (CPV) and fuel system, a positive crankcase ventilation (PCV) system, a turbocharging system, a brake booster system, and the like. An air filter may also be provided in the intake manifold or in fluid communication with the intake system.

The intake manifold 100 may be formed from one or more components. In the example shown, the intake manifold 100 is formed from an upper shell 106, a middle shell 108, and a lower shell 110 that are separately formed and then assembled. The lower shell 110 is configured to mate with the cylinder head 80 to connect the intake manifold 100 to the engine 20. In other examples, the manifold 100 is formed as a unitary component, or from any number of shells.

The cylinder head 80 has an intake port 104. The cylinder head 80 also has a face 112, or first face, that defines an entrance 114 or entrance region to each intake port 104. The entrance 114 may be defined as an aperture that lies in the plane of the face 112. The intake manifold 100 also defines a face 116, or second face, that defines an outlet 118 or outlet region from each runner 102. The outlet 118 may be defined as an aperture that lies in the plane of the face 116, an aperture that lies in the plane between the middle and lower shells 108, 110, or along another plane section of the manifold 100. The faces 112, 116 are configured to mate with one another to fluidly connect the runner 102 of the intake manifold 100 to the intake port of the cylinder head 80 while providing sealing, for example, with a gasket or other sealing member positioned between the faces 112, 116.

The lower shell 110 forms the mating face 116 of the intake manifold 100, and as such, may also define a gasket groove formed to receive a gasket or other sealing member. The lower shell 110 may be the same shell as was designed for use with the original displacement engine 20 before downsizing as the face 116 of the intake manifold 100 needs to maintain the same sealing and connection features with the face 112 of the carryover head 80.

A cross-sectional area of the entrance 114 to the intake port 104 is larger than a cross-sectional area of the outlet 118 from the runner 102 based on the downsizing of the engine, such that an area mismatch is created between the entrance 114 and the outlet 118. In one example, the area mismatch is caused by using a carryover head designed for a 1.5 liter engine in a downsized engine having a 1.2 liter displacement with an intake designed for the 1.2 liter displacement as shown in FIG. 2 such that the cross sectional area of the entrance to the head is 29 or 30 percent larger than the cross sectional area of the runner or the cross sectional area of the outlet of the intake manifold. In various examples, the entrance 114 area is up to up to thirty-five percent greater than the outlet 118 area, the entrance 114 area is up to twenty-five percent greater than the outlet 118 area, the entrance 114 area is fifteen to thirty-five percent greater than the outlet 118 area, or the entrance 114 area is twenty-five to thirty percent greater than the outlet 118 area.

The intake port 104 and the entrance 114 have a roof 120 and a floor 122 that are generally opposed to one another, and are connected via side regions or sections. Generally, the floor 122 is positioned between the roof 120 and a deck face of the cylinder head 80. The runner 102 and the outlet 118 also have a roof 124 and a floor 126 that are generally opposed to one another, and are connected via side regions 128 or sections.

The intake manifold 100 is connected to the head 80 such that the roofs 120, 124 are line-on-line with one another, or are sized, formed, and connected such that they are flush with one another or form a continuous, smooth surface with each other. Likewise, the side regions of the entrance 114 to the intake port 104 and the side regions 128 of the outlet 118 are connected line-on-line with one another, or are sized, formed, and connected such that they form a continuous, smooth surface with each other. As the areas between the entrance and outlet are mismatched, an offset, discontinuity, or step region is created between the floors 122, 126 of the entrance 114 and the outlet 118, as seen in FIG. 2.

A projection or tongue 130 is formed and acts to fill in the area mismatch or fill in the step to provide the smaller effective diameter or smaller area associated with the outlet 118 and the runner 102 into the intake port 104. The tongue 130 has a cross-sectional area that is sized to be substantially similar to the area difference between the entrance 114 and the outlet 118, for example, as up to thirty-five percent of the outlet 118 area, up to twenty-five percent of the outlet 118 area, fifteen to thirty-five percent of the outlet 118 area, or twenty-five to thirty percent of the outlet 118 area.

The tongue 130 is positioned such that it extends over and is generally in contact with or supported by the floor 122 of the intake port 104 such that it forms a localized floor for the port 104. The tongue 130 acts to provide a smaller effective diameter or smaller cross-sectional area into the carryover head 80 and intake port 104. The tongue 130 may extend across the entire width of the floor 122 such that it extends between the side regions of the intake port 104. The tongue 130 extends into the intake port 104 to a distal end 132 of the tongue 130. The distal end 132 may be generally opposed to a fuel injector 46 in one example. In one example, for a 1.5 liter head used with a downsized 1.2 liter engine and corresponding intake manifold, the tongue 130 extends into the port for approximately 50-55% of the length of the port. In other examples, the tongue 130 extends more than forty percent the length of the port, more than fifty percent the length of the port, more than seventy-five percent the length of the port, or up to the entire, full length of the port.

The distal end 132 may be tapered or otherwise shaped to control the flow characteristics of the intake gases. The tongue 130 may also be shaped to influence flow characteristics, for example, the surface of the tongue that contacts the intake gases may be generally planar, or may have various convex and/or concave contours, surface roughnesses, etc. The tongue 130 may be shaped such than an upper surface of the tongue runs parallel with the floor 122 of the port. For a port having a curved floor, the upper surface of the tongue would also be curved as a parallel curve with the tongue upper surface having points that are at a fixed normal distance from the port floor.

The tongue 130 projects outwardly from the face 116 of the intake manifold 100 such that it is inserted into the intake port 104 of the head 80. In one example, the tongue 130 is formed by a projection of the middle shell 108. In other examples, the tongue 130 may be formed by a projection of another shell of the intake manifold 100. The tongue 130 may be integrally formed with a shell of the manifold 100, or may be a separate component that is connected to the intake manifold 100.

In one example, the tongue 130 is formed from a metal material, and the shells of the intake manifold 100 are formed from a composite or plastic material. In other examples, the tongue 130 is formed from a plastic material or a composite material, and may be integrally formed with a portion of the intake manifold 100, or may be separately formed and attached to the intake manifold. The tongue 130 may be formed from a material that has a higher melting point than the intake manifold 100 as the tongue 130 is inserted into and in contact with the cylinder head 80 and may experience higher temperatures during engine operation.

Figure 4:
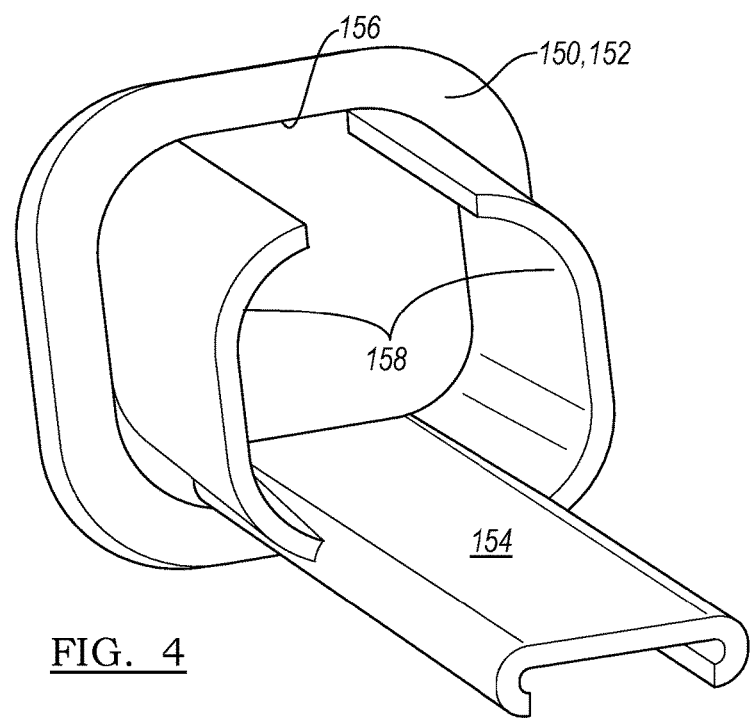
FIG. 4 illustrates a perspective view of an insert for use with the engine of FIG. 1 according to an embodiment.
Figure 5:
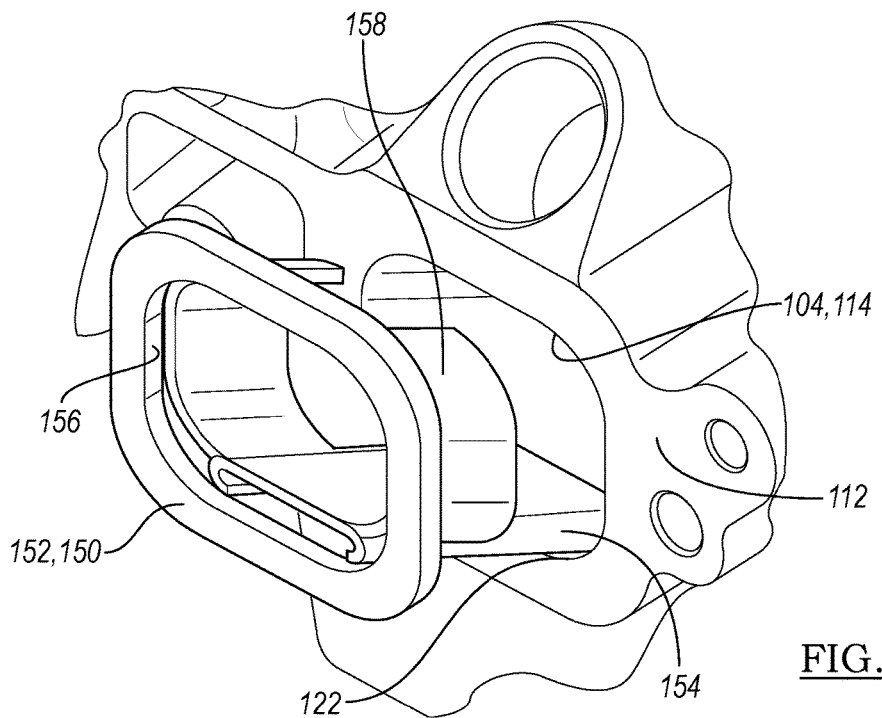
FIG. 5 illustrates a perspective view of the insert of FIG. 4 and a cylinder head.

FIGS. 4-5 illustrate another example of a tongue for use with the cylinder head 80 and engine. As described above, the engine has a downsized displacement such that an area mismatch and offset are created between the entrance 114 to the intake port 104 and the outlet 118 from the runners 102.

An insert 150 is provided, and has a flange 152 that defines an aperture 156 therethrough. The insert 150 and the flange 152 support a tongue 154, that provides control over flow characteristics of intake gases and is implemented similar to tongue 130 above. The flange 152 is configured to be positioned between the faces 112, 116 of the head 80 and the intake manifold 100 such that the aperture 156 fluidly connects the runner 102 with the intake port 104. One side or face of the flange 152 seals with the intake gasket and the manifold 100. The other side or face of the flange 152 lays against the cylinder head 80 intake mounting face 112.

The tongue 154 is inserted into the intake port 104 as described above, and as shown in FIG. 5. The tongue may be supported by a portion of the tongue on the floor of the port, as shown by the rolled edges of the tongue in FIGS. 4-5, or the bottom surface of the tongue may be shaped to mate with the floor of the port and support the tongue within the port. The insert 150 also has first and second wall sections 158. The wall sections 158 extend outwardly from the flange 152, and may extend in the same direction as the tongue 154, or in an opposed direction. In one example, the wall sections 158 are sized such that they provide an interference fit with the intake port 104. The wall sections 158 may include tension features that hold or retain the insert 150 in the cylinder head port 104, for example, without the use of additional mechanical fasteners.

With reference to FIGS. 2-5, the tongue 130, 154 is inserted into the intake port 104 to provide a smaller cross-sectional area flow path for the intake gases farther into the engine. The tongue 130, 154 is provided as a fixed or passive control in the cylinder head 80 of the engine to change the flow characteristics of the intake gases, such that the tongue 130, 154 is not moveable during engine operation.

When an engine is downsized to a smaller displacement, a new intake manifold 100 is provided for use with the original carryover cylinder head 80 and block. In this scenario, the intake gases often have poor charge motion into the cylinder 22, which may result in reduced combustion efficiencies and reduced engine performance. One non-limiting example or application for using a downsized engine is a hybrid vehicle with external exhaust gas recirculation and limited engine operating speed range. By downsizing the displacement of the engine and using a unique intake 38 designed for the new smaller displacement with smaller effective diameter runners, an area mismatch is created between the new runner 102 and the carryover intake port 104.

For example, an intake manifold 100 is provided for a downsized cylinder head 80 that has a reduced effective diameter or cross-sectional area of the intake runner 102 air path. The runner 102 is connected to the intake port 104 of the carryover cylinder head 80 along the roof 120 of the port 104 such that the runner 102 and intake port 104 are connected line-on-line along the roofs and the runner 102 is shifted to the high side of the port 104, which creates a step along the floors 122, 126 of the runner 102 and port 104 due to the area mismatch. A tongue 130, 154 is provided to fill the area mismatch along the floors 122, 126 and extends into the intake port 104 along the floor 122 of the port 104.

As the tongue 130, 154 effectively decreases the cross-sectional area of the intake port 104, the tongue 130, 154 maintains the high velocity of the intake gases closer to the intake valve in the head 80. The tongue 130, 154 also fills in the step or offset, which prevents a discontinuity in the flow path and prevents an abrupt change in area, which may otherwise lead to disruption in the intake gas flow, for example, an eddy or swirl. The tongue 130, 154 also increases the velocity of the intake gases along the upper region of the intake port 104, e.g. near the roof 120. The tongue 130, 154 directs more flow of the intake gases, e.g. increased velocity flow, through the upper and central portions of the intake port 104 and intake valve, which in turn, induces tumble and swirl of the intake gases into the cylinder 22.

The tongue 130, 154 is shaped to maintain in-cylinder charge motion and mixing of intake gases in-cylinder in the engine. The tongue 130, 154 leads to improved in-cylinder charge motion, and increased tumble motion in-cylinder. The increased tumble provided by the tongue 130, 154 maintains high intake port velocities, thereby improving in-cylinder charge motion.

Figure 6:
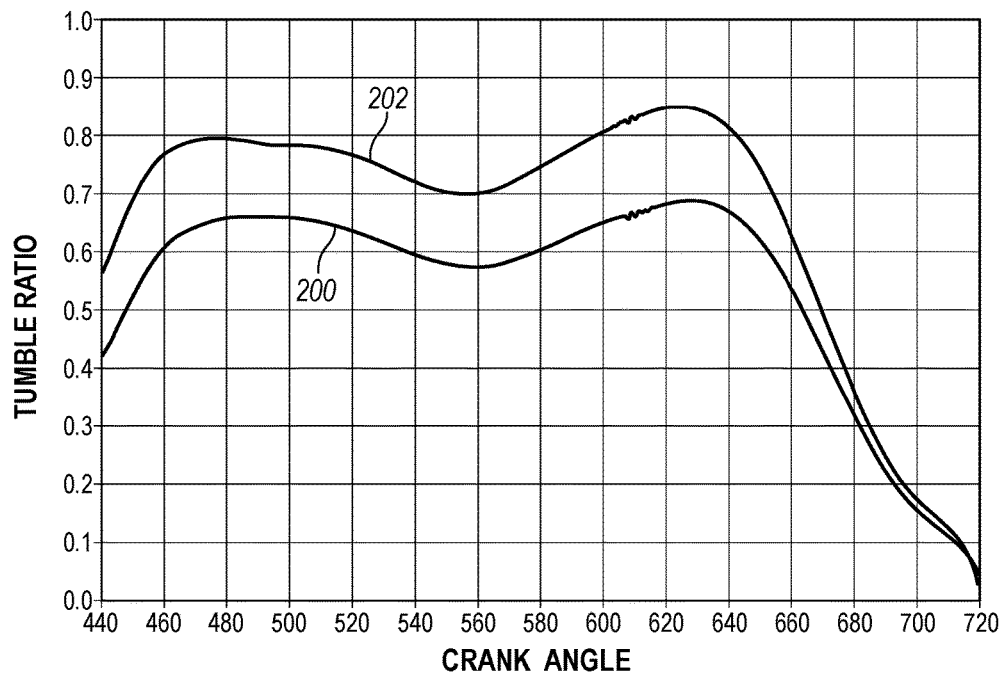
FIG. 6 illustrates a chart of tumble ratio versus crank angle for an engine with a tongue and without a tongue in the intake port.

A chart illustrating tumble ratio versus crank angle is provided in FIG. 6. Tumble ratio is the angular speed of the flow about the center of mass divided by the angular speed of the crank shaft. A higher tumble ratio results in improved charge motion in-cylinder. Line 200 illustrates the tumble ratio for a downsized engine using an intake manifold without a tongue 130, 154 feature. Line 202 illustrates the tumble ratio for a downsized engine using the same sized intake manifold as line 200 with a tongue 130, 154 feature. As can be seen in the Figure, the tongue 130 and 154 increases the tumble ratio across all crank angles, which corresponds to an improved charge motion of the intake gases, and an engine with improved combustion characteristics and increased efficiency. This increased tumble ratio is also provided by the tongue 130, 154 across all engine speeds and engine loads.

Figure 7:
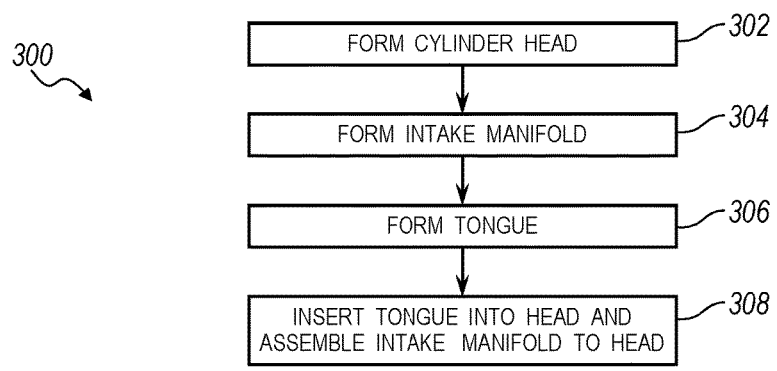
FIG. 7 illustrates a flow chart for forming and assembling an engine according to an embodiment.

FIG. 7 illustrates a flow chart representing a method 300 of providing an intake manifold and an engine according to the present disclosure. The intake manifold may be the intake manifold 100 as described above. In other embodiments, the method 300 may include a greater or fewer number of steps, and various steps may be performed sequentially or in parallel with one another. The steps in the method 300 may also be ordered differently from the illustrated method in other embodiments.

A cylinder head is provided at step 302. The cylinder head may be a carryover cylinder head from an engine with a larger displacement. The cylinder head may be formed from a metal using a casting, die casting, or other process. In other examples, the cylinder head may be formed from another material. The cylinder head may be a head 80 as described above. The cylinder head is formed with a face 112 that defines an entrance 114 to an intake port 104.

An intake manifold is formed at step 304. The intake manifold is sized for use with a cylinder block and head that are downsized via a reduction in stroke. The intake manifold may be formed from a composite or plastic material, for example, using an injection molding or other process. The intake manifold is formed with a face 116 defining an outlet 118 from a runner 102. The intake manifold may be the manifold 100 as described above. The intake manifold is formed with runners 102 having a smaller cross-sectional area than the intake port 104 of the head, such that an area offset or mismatch is created between the outlet from the manifold and the entrance to the intake port, where the entrance area is greater than the outlet area.

At step 306 a tongue is formed. The tongue is sized to fill the offset between the outlet and the entrance. In one example, the tongue is made from a metal or metal alloy. In other examples, the tongue is formed from a plastic or a composite material. The tongue may be the tongue 130 as described above that is supported by the intake manifold and extends outwardly from the face 116 of the manifold. The tongue 130 may be formed from the same material or a different material compared to the intake manifold. In another example, the tongue may be the tongue 154 that is formed as a part of an insert 150 and is supported by the insert, where the insert has a flange defining an aperture configured to fluidly connect the manifold and the head.

At step 308, tongue is inserted into the cylinder head such that the tongue extends along the floor 122 of the intake port. The tongue maintains in-charge motion and mixing of intake gases in-cylinder in the engine by increasing velocity in the intake port and providing higher velocities along the roof 120 of the port 104. The tongue may be part of an insert 150 or part of the manifold 100. The intake manifold 100 and head 80 are assembled together such that the faces of the manifold and head are connected to fluidly connect the outlet of the manifold with the entrance of the inlet port of the head.

Various embodiments according to the present disclosure have associated, non-limiting advantages. For example, an insert or tongue is provided that extends into the intake port of the cylinder head of an engine. The tongue is sized and shaped to extend along the floor of the port to fill an area mismatch between the intake port of the cylinder head and a corresponding runner of an intake manifold. The area mismatch occurs, for example, when an engine is downsized and a new intake manifold is provided for use with the cylinder head. The tongue may be integrally formed with the intake manifold, or may be provided as an additional insert that is positioned between the head and manifold during assembly. The tongue acts as a control mechanism for intake air flow into the engine and cylinder by increasing intake air velocities and increasing tumble into the cylinder.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine comprising:
 a cylinder head having a first face defining an entrance to an intake port;
 an intake manifold having a second face defining a runner outlet, the first and second faces mating to fluidly connect the entrance and outlet; and
 a tongue extending over a floor of the port from the second face to a tapered distal end and having an area substantially equal to an area difference between the entrance and outlet.

2. The engine of claim 1 wherein the entrance area is ten to twenty-five percent greater than the outlet area.

3. The engine of claim 2 wherein the area of the tongue at the entrance is equal to ten to twenty percent of the entrance area.

4. The engine of claim 1 wherein the tongue extends into the intake port from the first face to the tapered distal end, the tongue sized to cover the floor of the intake port between the first face and the distal end.

5. The engine of claim 1 wherein the tongue is shaped to maintain in-charge motion and mixing of intake gases in-cylinder in the engine.

6. The engine of claim 1 wherein the tongue is formed by a projection extending outwardly from the second face of the intake manifold.

7. The engine of claim 1 wherein a roof and side regions of the entrance are line-on-line with a roof and side regions of the outlet.

8. The engine of claim 7 wherein the floor of the entrance is offset from a floor of the outlet.

9. The engine of claim 1 wherein the tongue comprises a metal.

10. The engine of claim 9 wherein the intake manifold comprises at least one of a plastic and a composite material.

11. The engine of claim 1 further comprising an insert supporting the tongue, the insert having a flange defining an aperture therethrough, the flange positioned between and cooperating with the first and second faces such that the aperture fluidly connects the runner and the intake port and the tongue is inserted into the intake port.

12. The engine of claim 11 wherein the insert has first and second wall sections, the tongue positioned between the wall sections, the wall sections extending outwardly from the flange and inserted into the intake port of the cylinder head, the wall sections configured to mate with the wall of the intake port such that the insert is retained to the cylinder head.

13. A method comprising:
 providing a cylinder head having a first face defining an entrance to an intake port;
 forming an intake manifold having a second face defining a runner outlet, the entrance area larger than the outlet area; and
 inserting a tongue along a floor of the intake port while connecting the first and second faces to fluidly connect the outlet with the entrance, the tongue sized to fill an offset created by an area mismatch between the outlet and the entrance.

14. The method of claim 13 wherein the intake manifold is sized for use with a cylinder block that is downsized via a reduction in stroke.

15. The method of claim 13 wherein the tongue extends along a length of the floor of the intake port and maintains in-charge motion and mixing of intake gases in-cylinder.

16. The method of claim 13 wherein forming the intake manifold includes forming the tongue extending outwardly from the second face.

17. The method of claim 13 further comprising positioning an insert between the first and second faces, the insert having a flange defining an aperture fluidly connecting with the entrance and the outlet, the insert supporting the tongue.

18. An engine comprising:
 an intake manifold having a first face defining a runner outlet;
 a cylinder head having a second face defining an entrance to an intake port, the first and second faces mating to fluidly connect the entrance and outlet, the entrance area being 110-125% of the outlet area; and
 a tongue extending over a floor of the port and having an area substantially equal to an area difference between the entrance and outlet.

19. The engine of claim 18 wherein the area of the tongue at the entrance is equal to ten to twenty percent of the entrance area.

\* \* \* \* \*